(12) United States Patent
Gupta et al.

(10) Patent No.: US 9,479,533 B2
(45) Date of Patent: Oct. 25, 2016

(54) TIME BASED AUTHENTICATION CODES

(71) Applicant: Go Daddy Operating Company, LLC, Scottsdale, AZ (US)

(72) Inventors: Nitin Gupta, Mountain View, CA (US); Charles Beadnall, San Mateo, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

(21) Appl. No.: 14/575,982

(22) Filed: Dec. 18, 2014

(65) Prior Publication Data

US 2016/0182562 A1   Jun. 23, 2016

(51) Int. Cl.
*H04L 29/00* (2006.01)
*H04L 29/06* (2006.01)
*H04L 9/08* (2006.01)
*G06F 21/62* (2013.01)

(52) U.S. Cl.
CPC ........... *H04L 63/1466* (2013.01); *G06F 21/62* (2013.01); *H04L 9/0861* (2013.01); *H04L 9/0869* (2013.01); *H04L 63/04* (2013.01); *H04L 63/0846* (2013.01); *H04L 63/10* (2013.01)

(58) Field of Classification Search
USPC ................... 726/1–10, 26–30; 713/155–159, 713/168–173; 709/217–229
See application file for complete search history.

(56) References Cited

U.S. PATENT DOCUMENTS

| | | | |
|---|---|---|---|
| 6,298,341 B1 | 10/2001 | Mann et al. | |
| 6,519,589 B2 | 2/2003 | Mann et al. | |
| 6,880,007 B1 | 4/2005 | Gardos et al. | |
| 7,069,323 B2 | 6/2006 | Gardos et al. | |
| 7,076,541 B1 | 7/2006 | Burstein et al. | |
| 7,472,160 B2 | 12/2008 | King et al. | |
| 8,751,685 B2 | 6/2014 | Parsons | |
| 8,775,675 B2 | 7/2014 | Parsons | |
| 2002/0010795 A1 | 1/2002 | Brown | |
| 2002/0178383 A1 | 11/2002 | Hrabik et al. | |
| 2003/0132967 A1 | 7/2003 | Gangadharan | |
| 2003/0163739 A1* | 8/2003 | Armington | G06F 21/32 726/3 |
| 2004/0064561 A1 | 4/2004 | Parsons et al. | |
| 2004/0083306 A1 | 4/2004 | Gloe | |
| 2004/0199620 A1 | 10/2004 | Ruiz et al. | |
| 2005/0144323 A1 | 6/2005 | Gardos et al. | |
| 2005/0273344 A1 | 12/2005 | Lee et al. | |
| 2007/0214284 A1 | 9/2007 | King et al. | |
| 2008/0005127 A1 | 1/2008 | Schneider | |
| 2008/0065974 A1 | 3/2008 | Campbell | |
| 2008/0215716 A1 | 9/2008 | Parsons | |
| 2009/0171678 A1 | 7/2009 | Zimmerman et al. | |

(Continued)

OTHER PUBLICATIONS

Wellington, Brian. Secure domain name system (DNS) dynamic update. No. RFC 3007. RFC 3007, Nov. 2000.*

(Continued)

*Primary Examiner* — Madhuri Herzog
(74) *Attorney, Agent, or Firm* — Quarles & Brady LLP (57) ABSTRACT

Systems and methods of the present invention provide for one or more server computers communicatively coupled to a network and configured to: receive a request for the change key from a registrant of the domain name; generate the change key comprising a random string not stored on the server computer; identify the timeout period within the database; transmit the change key to: a contact for the registrant; and a domain name registry; determine whether the change key is received by the server computer during the timeout period; and if so, update the domain name.

18 Claims, 4 Drawing Sheets

(56) References Cited

U.S. PATENT DOCUMENTS

| | | |
|---|---|---|
| 2009/0171823 A1 | 7/2009 | Zimmerman et al. |
| 2009/0177549 A1 | 7/2009 | Ruiz |
| 2010/0175137 A1 | 7/2010 | Parsons |
| 2010/0287254 A1 | 11/2010 | Ruiz |
| 2010/0287484 A1 | 11/2010 | Ruiz |
| 2010/0325723 A1* | 12/2010 | Essawi ............... H04L 9/3226 726/20 |
| 2012/0174198 A1* | 7/2012 | Gould ............... H04L 63/0807 726/6 |
| 2014/0188871 A1 | 7/2014 | Bushlack |
| 2014/0373097 A1 | 12/2014 | Thayer et al. |
| 2014/0373127 A1 | 12/2014 | Thayer et al. |

OTHER PUBLICATIONS

Wellington, Brian. Secure domain name system (DNS) dynamic update. No. RFC 3007. 2000.*

Inter-registrar Domain Name Transfers Process Description & Overview, Aug. 20, 2001.

Fusu introduces Domain Stock Exchange in private beta, http://www.domainnamenews.com/domain-sales/fusuintroduces-domain-stock-exchange-in-private-beta/885, Oct. 17, 2007.

Dnxpert, Fusu Domain Stock Exchange in Beta, http://www.dnxpert.com/2007/10/18/fusu-domain-stock-exchange-in-beta/.

Register.com to Issue Baltimore Digital Certificates Making e-Security Accessible to All e-Businesses, Nov. 20, 2008, Register.com, p. 1.

* cited by examiner

TIME BASED AUTHENTICATION CODES

FIELD OF THE INVENTION

The present inventions generally relate to the field of domain names and specifically to the field of increasing security for domain name change keys by sending domain name authentication codes to multiple recipient targets and utilizing time-based authentication codes when a domain name change key is requested.

SUMMARY OF THE INVENTION

The present inventions provide systems and methods comprising one or more computer networks. The network(s) may be configured to provide communications, via network connections, between one or more domain name registries, one or more domain name registrars and/or one or more domain name registrants. One or more databases communicatively coupled to the network may store a plurality of contacts designated to receive a change key authorizing an update to a domain name. One or more server computers may also be communicatively coupled to the network and may be configured to: receive a request for the change key; generate the change key; separate the change key into a plurality of divisions; transmit each of the plurality of divisions to a designated contact; determine whether the plurality of divisions is received by the server computer; and responsive to a determination that the plurality of divisions is received by the server computer: combine the plurality of divisions into the change key; and update the domain name.

The present inventions may also provide systems and methods comprising the network(s) disclosed above. One or more databases communicatively coupled to the network may store a timeout period during which a change key authorizing an update to a domain name is valid. One or more server computers may also be communicatively coupled to a network and may configured to: receive a request for the change key from a registrant of the domain name; generate the change key comprising a random string not stored on the server computer; identify the timeout period within the database; transmit the change key to: a contact for the registrant; and a domain name registry; determine whether the change key is received by the server computer during the timeout period; and responsive to a determination that the change key is received by the server computer during the timeout period, update the domain name.

The above features and advantages of the present invention will be better understood from the following detailed description taken in conjunction with the accompanying drawings.

DETAILED DESCRIPTION

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

As the Internet has grown in size and influence, Domain names have become a digital asset with significant financial value. The high value associated with domain names have caused some unscrupulous individuals to hijack the registration and control of domain names. Domain name hijacking or domain name theft may involve changing the registration of a domain name without the permission of its original registrant.

As non-limiting examples, a domain name hijacker may acquire personal information about the actual domain owner, possibly from domain name registry records, and impersonate them in order to persuade the domain registrar to modify the registration information and/or transfer the domain name to another registrar (the hijacker), who would then gain full control of the domain name.

Domain name hijacking has created a need for increased security when a domain name is registered, renewed, transferred between registrars or registrants, and/or when any other administrative functions affecting the domain name are needed. Increased security for such functions may require a domain name change key (change key), possibly comprising an authorization code to ensure that the person requesting such change is in fact the registrant of the domain name. Change keys may identify a valid registrant of a domain name. and may represent a uniform means to protect domain names by requiring verification of the valid registrant to prevent hijacking by ensuring that only the rightful domain name registrant can control domain name administrative functions.

As disclosed herein, change keys may also refer to and include a domain name authorization code, an auth code, a domain name transfer key, an EPP key, or any other known or proprietary security code used to prevent a domain name from being hijacked. It should be noted, however, that the synonymous use of these terms and/or phrases is for clarity and simplicity within the current disclosure. The application of each of these terms and/or phrases, as used interchangeably, should still retain any characteristics or subtle differences between them, as known in the art.

A change key may be generated by a registrar and used to "unlock" the administrative functions associated with a domain name. For example, the change key may support transferring any domain from one registrar to another. Although the change key may help identify the domain name registrant and may be required for a domain name transfer, it does not necessarily indicate approval of the transfer.

Change keys may be generated and transmitted via the Extensible Provisioning Protocol (EPP)—a protocol for allocating functions for objects, such as domain names, within registries over the Internet. EPP is often a simple text string, but may be based on a structured, text-based format, such as Extensible Markup Language (XML). EPP, or any other security measures known in the art may provide communication between domain name registries, domain name registrars and domain name registrants, creating a means for the EPP key to be transmitted between these entities. Currently, the typical means for transmitting the domain change key is to send the EPP key via email to the registrant, who utilizes the key as part of an EPP transfer command.

EPP keys, as a non-limiting example of change keys, may comprise a unique 6 to 32 character code assigned to a domain. They are designed to prevent fraudulent or unauthorized transfers. This code is an extra safety feature, similar to a credit card verification code or PIN for a domain, that helps ensure that the customer transferring the domain is indeed the owner of that domain.

As noted above, domain name hijacking and unauthorized changes to domain names are a common and pervasive security risk. Applicant has identified multiple weaknesses in presently existing systems and methods for providing security for such domain name administration. Currently, registrants may request auth change keys such as EPP keys in order to affect a changes to their registered domain names.

Registrars respond to such requests by either using a simple password before disclosing the change keys within a user account, or they simply email the change key to a single, known email address used by the registrant. In these situations, the user account may be hacked, or a man in the middle email hacker (or anyone else with access to the email account) may have access to the change key sent in this manner.

In addition, using these methods to provide access to the change key puts control of the domain into the hands of a single person. Although a single administrator for a domain name may be desired in some situations, in others, control of the domain name may be most effective if the control is split among multiple administrators. As a non-limiting example, if an IT professional were fired from a position overseeing domain name transfers, this individual would have access to the keys needed to control all domain names and may use these keys for malicious purposes.

The disclosed inventions attenuate such risks. The disclosed systems and methods improve upon such modalities by designating multiple recipients, rather than a single recipient, to receive the change keys. The system then requires that at least a pre-determined percentage of the designated recipients to respond, thereby creating enhanced and more robust security against domain name hijacking and unauthorized changes, despite minor inconveniences to the domain name administrator.

Thus, the disclosed invention may increase security by only allowing acquisition of the change keys after the domain name registrant and all designated recipients have been authenticated through receipt of the change key divisions and the return of all required portions by the same recipients in order to re-assemble and/or generate the change keys. The contacts for each of these designated recipients may include any contact, such as an email address, SMS message, social media message from a social media account, etc.

Applicant has also identified multiple additional weaknesses in presently existing systems and methods for providing security for such domain name administration. As currently used in the art, the change keys are generated at the registry or the registrar, with the registrar of record setting the domain change keys for all domain names registered with that registrar. The registrar then stores, for an indefinite time, a local copy of each change key. The change key for each domain name is then forwarded to the appropriate registrant, who may use it and possibly store another local copy of the change key on their client machines.

Unless the change key is renewed or deleted, these local copies of the change keys may be indefinitely stored, and still valid. Due to this potential longevity of the key's validity and storage within numerous systems, these change keys are easily exploitable by malicious attackers.

The disclosed invention may resolve these security concerns, by completely eliminating environments that store change keys and by generating change keys that are only known to the registrant and to the registry for a limited time after receiving the request for the change keys.

To accomplish this, the disclosed invention provides systems and methods for generating disposable time-based authentication codes for domain name administration each time such administration is requested. Such systems and methods may generate change keys made up of random character and digit strings, and which are only available for a limited time. The generated character and digit strings making up the change keys may also be reset to a different configuration of characters or digits and/or may be deleted, so that the change keys expire or cease to exist after a timeout period.

By generating temporary and random digits for a limited time, no change keys are ever stored on the registrar's systems and these keys for domain changes are only known by the registrant and registry for the limited time, when specifically requested, thereby reducing the possibility of domain hijacking. Hacking into a registrar's system to steal stored keys in order to steal domains would be a useless exercise in such embodiments, since any existing keys would have been either reset or deleted after the timeout period.

Figure 1:
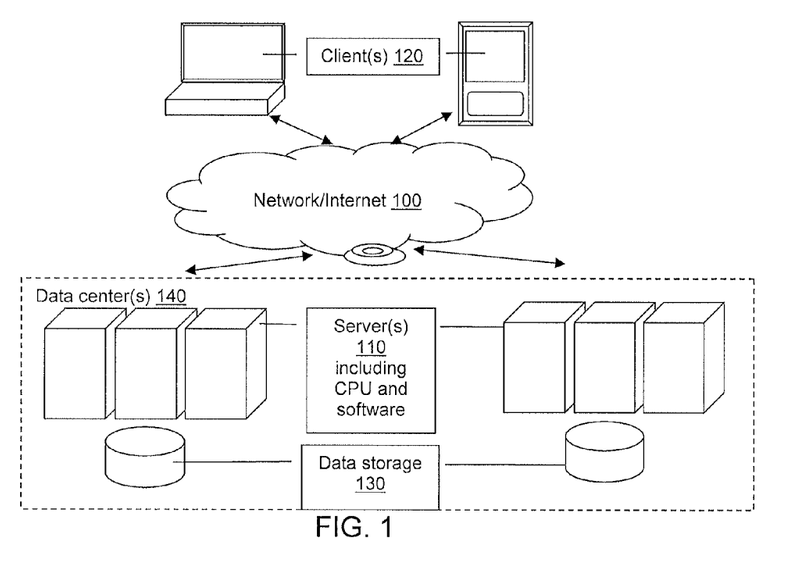
FIG. 1 illustrates a possible system for increasing security by sending authentication codes to multiple recipients and/or utilizing time-based authentication codes.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

In the context of the current invention, network 100 may be configured to provide communications, via network connections, between one or more domain name registries, one or more domain name registrars, one or more domain name registrants and/or one or more users of the disclosed system. These network connections may be configured to handle EPP; as well as email, SMS and/or social media transmission and reception. Specifically, these network connections may provide means to request and receive the disclosed change keys.

Figure 2:
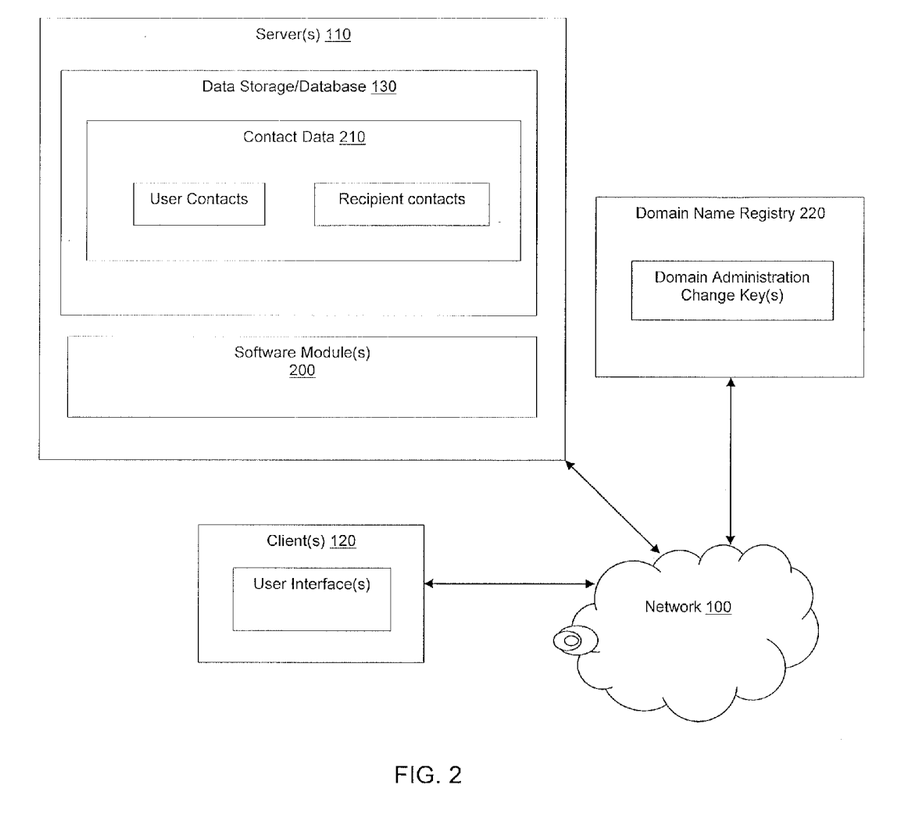
FIG. 2 illustrates a more detailed possible system for increasing security by sending authentication codes to multiple recipients and/or utilizing time-based authentication codes.

FIG. 2 shows a more detailed example embodiment of an environment for the systems, and for accomplishing the method steps, disclosed herein. As non-limiting examples, all disclosed software modules 200 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, using data in data storage 130 associated with the software modules 200. Thus, the disclosed system may be configured to execute any or all of the method steps disclosed herein.

Server(s) 110 may be hosted by any entity, possibly a hosting provider, a domain name registrar, a website development company, any other software service provider or any combination thereof. To manage users of such a system, including individuals or organizations, server(s) 110 may host and run a user administration program such as GoDaddy's My Account control panel for managing hosting and domain names, as a non-limiting example.

In such an administration control panel program, or admin, each user may be assigned a user id. This user id may identify transactions performed by each user. These transactions may be stored as data records in data storage 130, each data record including the user id to associate the user with the transaction in the database.

To increase security of domain name change keys, a user may designate multiple recipients, each receiving a division of the change key. In these embodiments, the user may store contact data for registered and/or authorized contacts 210. These registered and/or authorized contacts 210 may include both contacts for the user and for additional contacts that are not contacts for the user, but contacts that are selected by the user.

In other words, in addition to the contact data entered when the user created their user administration account, registered and/or authorized contacts 210 may include additional contacts for the user that requested the change keys, such as when the user wants to apply a multiple auth strategy described below. Registered and/or authorized contacts may also include one or more additional contacts for recipients who are not the user, but to whom the additional divisions of the change keys may be sent, in order to avoid any one contact having too much control over the domain name administration.

As non-limiting examples, the data for such registered and/or authorized contacts may comprise: an email address for the user and/or the one or more additional recipients; phone/SMS access data (e.g., phone number) for the user and/or the one or more recipients; social media account data (possibly including Twitter handles, messaging data, Facebook messages, API data for accessing any of the above, etc.) for the user and/or the one or more recipients, etc.

Embodiments incorporating multiple recipient change keys may be used for multiple purposes. As a non-limiting example, the user may apply a multi authentication/multi token approach to the user's own multiple contacts. Multi-factor or multi-token authentication may includes methods of computer access control which a user can pass by successfully presenting authentication factors from at least two of three categories, as a non-limiting example. Requiring more than one independent factor increases the difficulty of providing false credentials. The number and independency of factors is important, since more independent factors imply higher probabilities that the bearer of the identity evidence indeed holds that identity in another realm.

Thus, security may be improved for the change keys by dividing the change key and sending it to multiple avenues controlled by the user. The disclosed user interface may present the user with means to provide multiple additional contacts for the user to send the divided transfer key. This embodiment may allow for the loss of an email address or other contact, without blocking the ability to modify a domain.

Another application of the multiple recipient change keys may allow the change keys to be sent to multiple contacts who are not the user to confirm the intended domain name change. In these embodiments, a user may select a plurality of contacts who are not the user, designating each of the additional selected contacts to receive only a portion of the divided change keys. This may have the effect of ensuring that none of the users would have absolute control of the change keys without the approval of at least a percentage of the total users.

As non limiting examples, multiple business partners may receive a portion of the change keys via contact means such as email, mobile device/SMS, social media, etc. In order to unlock the domain name administrative functions, these users (or a designated percentage of them) must respond and/or enter their portion of the change keys in order to affect the domain name change. In the previously noted example above, the fired IT professional would be unable to affect the domain name change since he only controls a portion of the change keys.

In some embodiments, after entering and selecting the registered and/or authorized contacts 210, a confirmation message may be sent to the contacts 210 to confirm that they are valid means of contacting the registered and/or authorized contacts. In these embodiments, the contacts will not receive, or be able to send, divisions of the change keys until after they have been confirmed.

In both the multi auth/token embodiments and embodiments where additional contacts include contacts that are not the user, a pre-determined number of additional users that must respond to the divided change keys, or a percentage of responses that must be received may be set within the system. As non-limiting examples, a user may select settings, possibly via the user interface, that a response must be received from the user or the user's spouse's phone number and email address, or that a response must be received from 3 contacts that are not the user.

Expressed in percentages, the settings may require, as non-limiting examples, 66% of multi auth sources, 75% of additional contacts, a majority vote, etc. Expressed mathematically, the user may set any X of Y with 1 and 1 being the minimum of both. Alternatively, a customer may supply N email addresses or phone numbers and then specify how many of those recipient targets must respond (e.g., from 1 to N). When the pre-determined threshold number has been reached, the responses may unlock the domain and affect the change.

In order to affect changes to the domain name, a user may submit a request to the domain name registrar to initiate the changes. This request may include a request for a change key. This change key may either be a authorization key such as an EPP key, or may be an internal means of authenticating the user so that the change key may then be sent to the user or entered into the system to create the requested changes to the domain name. In some embodiments, the change keys may either be separated into divisions of the original change key, such as an EPP key, or various other layers of security may be implemented that require the user to authenticate their identity, as described in more detail below.

In some embodiments, the change keys may be simply divided among the contacts designated by the user from the user interface, as described above. As a non-limiting example, an EPP key is a string of alphanumeric characters. These alphanumeric characters may be simply divided among the number of contacts designated and send these divisions of the change key to the designated contacts with instructions, possibly including the number of characters originally included in the string (e.g., this key is 20 characters long), the placement of the characters (e.g., the first 10 are going here, the second 10 going there, and at least 2 people need to be able to "turn" the key to "unlock" the domain name changes).

This change key may be divided among as many intended recipients as there are characters in the change keys. Thus, as a non-limiting examples, If there are two intended recipients for a 20 character EPP key, each may receive half of the EPP key and be required to respond with 10 characters to affect domain name changes. If there are 20 characters in an EPP key, and there are 20 intended and designated recipients, and a 100% response is required to affect domain name changes, each of the intended recipients will receive one character from the EPP key, and a response for each of these recipients will be required to affect changes to the domain name.

In some embodiments, where it is impractical to simply divide the change keys into a number of divisions, one or more hash functions may be applied to the change keys before sending to each of the designated contacts. As a non-limiting example, such a hash function may be applied when the number of designated contacts exceeds the number of characters in the change key to be applied (e.g., if the EPP key is only 32 characters in length, but there are 35 designated contacts to which the EPP key is to be sent).

A hash function may comprise any known hashing techniques in the art, and/or may be any function that can be used to map digital data of arbitrary size to digital data of fixed size, with slight differences in input data producing differences in output data. The values returned by a hash function are called hash values, hash codes, hash sums, or simply hashes.

Each of the users may receive the designated hashed change keys for that user, and each user may then enter, submit and transmit that hash code via client(s) 120 to be received by server(s) 110. Server(s) 110 may then receive the hash code from client(s) 120 and may process the data to determine whether the correct codes and number/percentage of codes match the parameters designated by the original user, possibly by accessing the parameters as stored in data storage 130.

Once all required hash codes are received, the server(s) 110 may determine if the number/percentage of codes received matches the number required. This determination may occur before or after the hash is applied. The hash may be applied to the received data, and if the appropriate number of responses have been received, the converted hashed data may be combined to reassemble the original change key. The reassembled proper change key string may then be sent to the registrar to affect the domain name changes.

In some embodiments, additional layers of internal and/or proprietary security may be applied using XML technologies. As non-limiting examples, such embodiments and technologies may include anything encapsulated in XML, such as a client side certificate, thereby generating security even more secure than an EPP key, as a non-limiting example.

As non-limiting examples, such embodiments may be reduced to practice by sending multiple divisions of the change keys that have been properly XML encoded. The designated recipients may receive these XML encoded codes, and may enter the appropriate response and transmit the response to server(s) 110.

Server(s) 110 may be running complimentary software modules and after receiving the appropriate response from the user via client(s) 120, may then use the software modules to combine the received codes into the original change keys, capable of affecting the domain name changes.

In some embodiments, an encrypted version of the change keys may be sent to one of the designated contacts, while the decryption key may be sent to a second designated contact. Some of these embodiments may include variations applying the XML embodiments previously described.

As a non-limiting example, a user may receive the encrypted key (possibly encoded via XML) within an email message, but then receive the decryption key that is displayed or applied via a decryption application on the user's phone, or via SMS. Using the decryption key via the application on the phone, the decryption key may be applied, and the encrypted change key may be unlocked and sent back to server(s) 110 for application to the desired domain name change, as described herein.

In some embodiments, contact data from one or more WHOIS records associated with the affected domain name may be used to seed the list of designated contacts. In these embodiments, the change keys may be segmented and sent to the designated contacts according to the email, phone number, SMS, social media contact etc., for the admin contact, technical contact, billing contact, etc. found in the WHOIS record(s) for the affected domain name.

Although this would represent an efficiency measure for the disclosed invention, caution would need to be taken to make sure that unscrupulous individuals did not take advantage of the public nature of WHOIS records to hijack the domain name.

To increase security of domain name change keys, a user may designate a limited time, after which a generated change key will be deleted or overwritten. In these embodiments, a user may select, possibly via the disclosed user interface, the timeout duration for which the change key will be generated and valid. As non-limiting examples, the user may select that the change key may be valid for 1 minute, 1 hour, 1 week, 1 year, etc. After the user requests the change key, the change key may then generated using random characters and may be available to the user, possibly displayed on the user interface, for the amount of time selected.

In some embodiments, the registrar may determine the duration of time the generated code is valid. To accomplish this, the registrar may analyze logs for users to determine an average length between receipt and use of the change keys and may set that as a default amount of time that the generated change keys will be available to the user.

In some embodiments, the servers may be configured to generate the requested temporary change keys. As in other embodiments disclosed herein, these change keys may comprise a string of alphanumeric characters, a hash of such characters and/or a one or more of XML-based documents and/or software configured to add layers of security to the change keys in order to prevent the domain name being hijacked.

In a non-limiting example use case, a user may want to explore available possibilities for a domain name, such as a domain name transfer. Even if the domain name is not sold, the user may request the domain names to make sure all necessary steps have been taken in case they decide to sell.

For time-based embodiments, this may be an ideal use case, since the change keys may be generated and ready, but will not be stored on the registry 220, registrant or registrar's computers, thereby avoiding a security risk for the domain name, where someone else could hack the computer system and hijack the domain name via the available change keys.

Software running on server(s) 110 may be configured to generate a set of random alphanumeric digits to temporarily populate the required field for change keys required to affect the relevant domain name. The temporary change key(s) generated may be one or more one-use authorization keys for domain name change that is only available for a limited time. As a non-limiting example, server(s) 110 may be running software capable of running character randomization software that is seeded using all alphanumeric characters.

Additional software logic may determine the required number of characters for the appropriate change keys. On receiving the request affecting the domain name, the character randomization software may generate an appropriate number of alphanumeric characters so that any required fields have an appropriate number and type of characters to complete the transaction. This process may be repeated for all domain name registrations that have requested changes requiring change keys.

In some embodiments, the requested change keys may be generated by the domain name registrar that registered the domain name. However, rather than generate change keys associated with the domain name and storing them on the registrar's server(s) 110, as is typically done today, the current invention may include embodiments where the registrar only generates the change keys, as disclosed above, when a request for the domain name change is received.

Although the domain name registrar may generate the change keys in these embodiments, the domain name registrar would not store the generated change keys at any time on the registrar's server(s) 110, the result being that it would be impossible for hackers to access the change keys and hijack the domain name, since no such codes exist on the registrar's server.

Once the change keys have been generated, they may be transmitted to the domain name registry 220 and/or may be simultaneously transmitted to the domain name registrant. On the registry side 220, the registrar may generate the change keys and send a known replacement key to the registry 220, replacing any existing change keys currently being used by that registry 220 for the domain name.

As the change keys are transmitted to the domain name registry 220 and the registrar, software logic may determine the timeout value during which these change keys will be valid. In some non-limiting example embodiments, this timeout period may be determined by a data records saved when the user selected the timeout period from the user interface disclosed above. The software may start the clock on this timeout period as the random digit based change keys are sent to the registry 220 and registrar, and may only be recognized as valid change keys until the expiration of the identified timeout period.

In some embodiments, the generated change keys may be valid only until the timeout value has expired, then the domain names may be reset to a new random value, so that no currently valid change keys exist in association with any registered domain name, thereby limiting the amount of exposure to valid domain name change keys, while also thwarting any attempts to hijack the domain names.

As noted above, in other embodiments, server(s) 110 for the registrar and/or registry 220 may simply delete the change keys at the end of the timeout period. In some of these embodiments, server(s) 110 may generate the temporary random digits as the change key, and may access the timeout period during which the temporary change key is valid. Server(s) 110 may render the temporary random digits to be used as the change key(s) (e.g., as a display in a web page), and/or possibly the timeout period, and may transmit the temporary change key(s) and/or timeout period to one or more client computers for display.

The display may be configured to display the temporary change key, and possibly the timeout code itself, only for the duration of the timeout period. Such an embodiment may ensure that the temporary change key is available to be used only during the timeout period, since the temporary change key literally disappears once the timeout period has expired.

Figure 3:
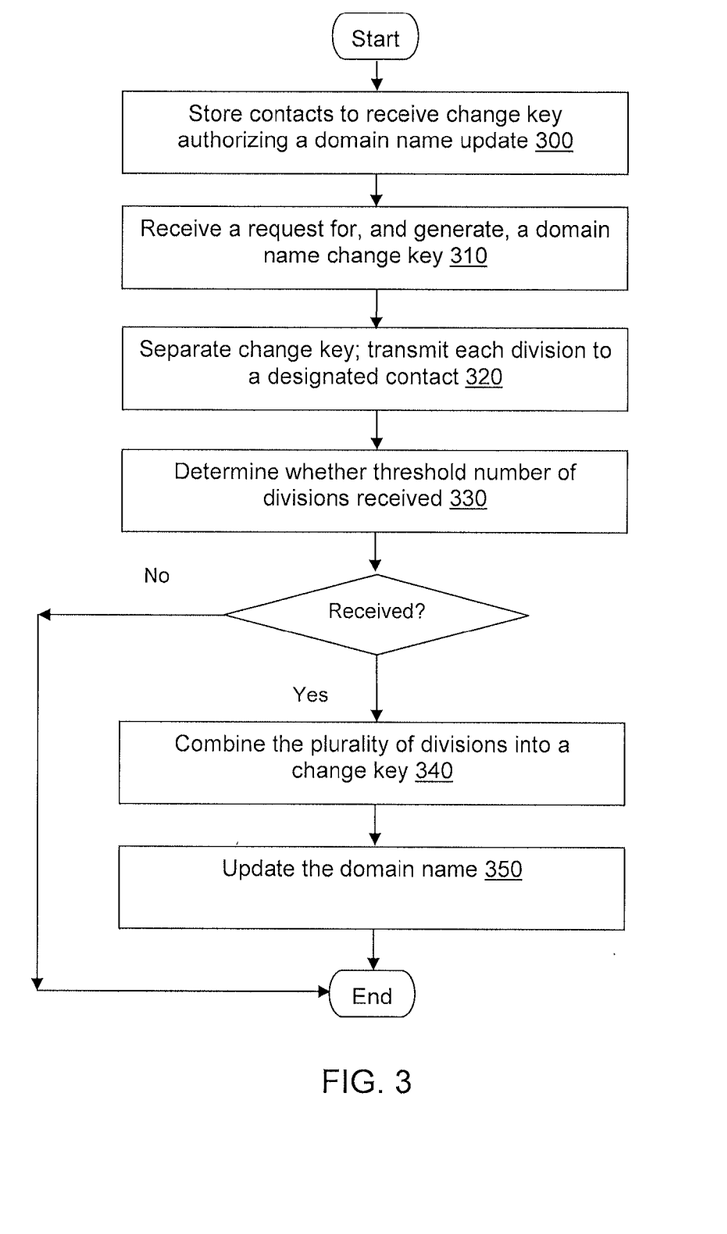
FIG. 3 is a flow diagram illustrating a possible embodiment of a method for increasing security by sending authentication codes to multiple recipients and/or utilizing time-based authentication codes.

Several different methods may be used to provide and manage the present systems. FIG. 3 represents a flow diagram for one possible embodiment of the previously described improvements on presently existing systems. In this example embodiment, the network 100 may be configured to provide communications, via network connections, between one or more domain name registries 220, one or more domain name registrars and/or one or more domain name registrants. One or more databases 130 communicatively coupled to the network 100 may store a plurality of contacts 210 designated to receive a change key authorizing an update to a domain name (Step 300). One or more server computers 110 may also be communicatively coupled to the network 100 and may be configured to: receive a request for the change key; generate the change key (Step 310); separate the change key into a plurality of divisions; transmit each of the plurality of divisions to a designated contact (Step 320); determine whether the plurality of divisions is received by the server computer 110 (Step 330); and responsive to a determination that the plurality of divisions is received by the server computer 110: combine the plurality of divisions into the change key (Step 340); and update the domain name (Step 350).

Figure 4:
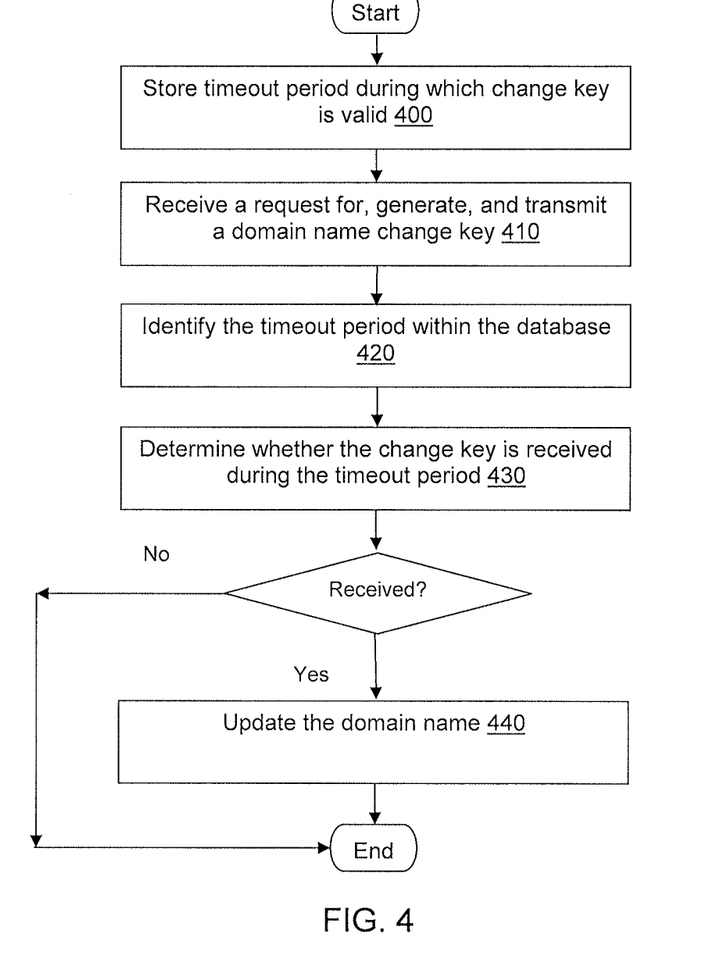
FIG. 4 is a flow diagram illustrating a possible embodiment of a method for increasing security by sending authentication codes to multiple recipients and/or utilizing time-based authentication codes.

In other embodiments such as that shown in FIG. 4, one or more databases 130 communicatively coupled to the network 100 may store a timeout period during which a change key authorizing an update to a domain name is valid (Step 400). One or more server computers 110 may also be communicatively coupled to a network 100 and may configured to: receive a request for the change key from a registrant of the domain name; generate the change key comprising a random string not stored on the server computer 110 (Step 410); identify the timeout period within the database 130 (Step 420); transmit the change key to: a contact for the registrant; and a domain name registry 220 (Step 410); determine whether the change key is received by the server computer 110 during the timeout period (Step 430); and responsive to a determination that the change key is received by the server computer 110 during the timeout period, update the domain name (Step 440).

The steps included in the embodiments illustrated and described in relation to FIGS. 1-4 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
a network configured to provide a plurality of transmissions between a registry, a registrar and a registrant associated with a domain name;
a database communicatively coupled to the network and storing a timeout period during which a change key authorizing an update to a domain name is valid, the update comprising a modification of at least one attribute of the domain name;
a server computer communicatively coupled to the network and configured to:
receive a request from a registrant of the domain name operating a client computer coupled to the network requesting the change key;
generate the change key comprising a randomized text string, wherein the change key is not stored on the server computer;
identify the timeout period within the database;
transmit the change key to:
a contact of the registrant; and
a domain name registry;
determine whether the change key is received by the server computer during the timeout period from the registrant, thereby authorizing the registrant to modify the at least one attribute of the domain name; and
responsive to a determination that the change key is received by the server computer during the timeout period, update the domain name.

2. The system of claim 1, wherein the timeout period is stored within a user setting in the database.

3. The system of claim 1, wherein the randomized text string comprises a random set of alphanumeric characters.

4. The system of claim 1, wherein the randomized text string is generated by a domain name registrar.

5. The system of claim 1, wherein the timeout period during which the change key is valid is set by a requestor requesting the change key.

6. The system of claim 1, wherein the timeout period during which the change key is valid is calculated from an average time between receiving the change key and updating the domain name.

7. The system of claim 1, wherein the server computer is further configured to reset the change key at the end of the timeout period.

8. The system of claim 1, wherein the server computer is further configured to delete the change key at the end of the timeout period.

9. The system of claim 1, wherein the server computer is further configured to:
   render, for a display on a client computer communicatively coupled to the network:
      the change key; and
      the timeout period; and
   remove, the change key at the end of the timeout period.

10. A method, comprising the steps of:
   receiving, by a server computer communicatively coupled to a network, from a registrant of a domain name operating a client computer coupled to the network, a request requesting a change key authorizing an update to the domain name, the update comprising a modification of at least one attribute of the domain name;
   generating, by the server computer, the change key comprising a randomized text string, wherein the change key is not stored on the server computer;
   identifying, by the server computer, in a database communicatively coupled to the network, a timeout period during which the change key is valid;
   transmitting, by the at least one server computer, the change key to:
   a contact of the registrant; and
   a domain name registry;
   determining, by the a server computer, whether the change key is received by the server computer during the timeout period from the registrant, thereby authorizing the registrant to modify the at least one attribute of the domain name; and
   responsive to a determination that the change key is received by the server computer during the timeout period, updating, by the server computer, the domain name.

11. The method of claim 10, wherein the timeout period is stored within a user setting in the database.

12. The method of claim 10, wherein the randomized text string comprises a random set of alphanumeric characters.

13. The method of claim 10, wherein the randomized text string is generated by a domain name registrar.

14. The method of claim 10, wherein the timeout period during which the change key is valid is set by a requestor requesting the change key.

15. The method of claim 10, wherein the timeout period during which the change key is valid is calculated from an average time between receiving the change key and updating the domain name.

16. The method of claim 10, further comprising the step of resetting the change key at the end of the timeout period.

17. The method of claim 10, further comprising the step of deleting the change key at the end of the timeout period.

18. The method of claim 10, further comprising the steps of:
   rendering, by the server computer, for a display on a client computer communicatively coupled to the network:
      the change key; and
      the timeout period; and
   removing, by the server computer, the change key at the end of the timeout period.

* * * * *